3,697,280

HEXAARYLBIIMIDAZOLE-SELECTED AROMATIC HYDROCARBON COMPOSITIONS

Peter S. Strilko, Wilmington, Del., assignor to E. I. du Pont de Nemours and Company, Wilmington, Del.

No Drawing. Filed May 22, 1969, Ser. No. 827,071
Int. Cl. G03c 1/72, 1/68, 5/24
U.S. Cl. 96—90 34 Claims

ABSTRACT OF THE DISCLOSURE

Photoactivatable compositions comprising a hexaarylbiimidazole and a selected aromatic hydrocarbon having at least three fused benzenoid rings, and optionally, a leuco dye and/or a polymerizable monomer or inert components such as binders, solvents and the like. The compositions are photoactivated in the near ultraviolet or visible light wavelengths.

BACKGROUND OF THE INVENTION

(1) Field of the invention

This invention relates to light-sensitive phototropic compositions and imaging systems. More specifically, this invention is directed to photodissociable hexaarylbiimidazoles in combination with an aromatic hydrocarbon sensitizer that absorbs in the near ultraviolet or visible light wavelengths.

(2) Description of the prior art

Hexaarylbiimidazoles dissociate upon exposure to ultraviolet light to form stable colored triarylimidazolyl radicals useful as light screens as described in British patent 997,396, published July 7, 1965. Such dissociation is useful in hexaarylbiimidazole/leuco dye compositions, for the triarylimidazolyl radical, formed as described above, oxidizes the leuco form of the dye to the colored form. Thus, colored images are obtained making the compositions useful in imaging applications, as described in British Pat. 1,047,569, published Nov. 9, 1966. However, the hexaarylbiimidazoles in general absorb largely and maximally at ultraviolet (UV) wavelengths below 300 mμ and to some much lesser extent at wavelengths as high as 430 mμ. Thus, while any of the imaging compositions described above containing the hexaarylbiimidazole are sensitive to radiation over substantially the whole UV range, they respond most efficiently to radiation that corresponds to or substantially overlaps the region of maximum absorption. It is not always practical to irradiate fully into this region. For example, in some imaging applications, it is desired to cover the photosensitive hexaarylbiimidazole-leuco dye imaging composition with a transparent film. Some film materials, such as "Mylar" and "Cronar" commercial polyesters, otherwise suitable, are not transparent below 300 mμ, and thus prevent such short wavelength activating radiation from reaching the biimidazole, with consequent loss in efficiency.

Further, many commercially important ultraviolet sources, such as cathode ray tubes widely useful in imaging devices that convert electrical to light energy and transmit such light as images to photosensitive surfaces (plates, papers, films), emit mainly in the near ultraviolet and above, owing in part to limitations in the available phosphors and in part to the screening by the fiber optic face plate of radiation below 300 mμ. Thus, imaging with such radiation sources is not entirely satisfactory as to the imaging speeds and optical densities that the hexaarylbiimidazole/leuco dye systems can inherently provide.

Thus, as the activating radiation contains increasing proportions of visible components or as components closer to the UV region are filtered out, hexaarylbiimidazole photolysis, hence color formation from leuco dye, becomes less efficient as to the amount of energy utilized and the optical quality of the image produced.

The present invention overcomes these deficiencies by enhancing the efficiency of the imaging systems described above in the near ultraviolet and visible light region of absorption through the use of selected aromatic hydrocarbon sensitizers.

SUMMARY OF THE INVENTION

This invention is directed to a photoactivatible composition comprising an admixture of (A) A hexaarylbiimidazole that has its principal light absorption bands in the ultraviolet region of the electromagnetic radiation spectrum and is dissociable to triarylimidazolyl radicals on irradiation with such absorbable ultraviolet light, and (B) An aromatic hydrocarbon that has at least three fused benzenoid rings, and has its principal light absorption bands in the near ultraviolet or visible regions of the electromagnetic radiation spectrum, and, optionally (C) A leuco dye that is oxidizable to dye by triarylimidazolyl radicals.

The invention is also directed to a photopolymerizable composition which comprises A and B, as defined above, and additionally, (D) An addition-polymerizable, ethylenically unsaturated monomer, (E) A photooxidizable amine and, optionally, (F) A chain transfer agent.

The invention is also directed to processes for irradiating the foregoing compositions.

DESCRIPTION OF THE INVENTION

This invention is based on the surprising discovery that an aromatic hydrocarbon as defined, which absorbs light at longer wavelengths than the hexaarylbiimidazoles can transfer such absorbed long wavelength light energy to the hexaarylbiimidazoles, i.e., the aromatic hydrocarbon can sensitize the hexaarylbiimidazole, thus converting it to the triarylimidazolyl radical. By thus extending the spectral sensitivity of the hexaarylbiimidazoles to wavelengths they do not normally absorb or absorb only weakly, the aromatic hydrocarbon significantly enhances their utility as light screens and photooxidants and photopolymerization initiators.

While the sensitization mechanism is not known with certainty it is considered that when compositions of this invention are irradiated with long wavelength light, the aromatic hydrocarbon absorbs the light and is activated to at least one excited energy transfer state. In such activated state it transfers absorbed energy to the hexaarylbiimidazole, for example through collision or resonance interaction and returns to the ground state, becoming available again for activation. The thus-indirectly-activated hexaarylbiimdazole dissociates into imidazolyl radicals.

The subsequent fate of the inherently colored and energy-rich imidazolyl radicals and their utilization in accordance with the various embodiments of this invention depends on the substantial absence or presence of other substances that are reactive towards the radicals. Thus in formulating light screens or windows containing hexaarylbiimidazole/aromatic hydrocarbon compositions, there will usually be employed components such as solvents and binders, as described by Cescon British Pat. 997,396, that are substantially inert, i.e., resistant to, oxidation by the imidazolyl radicals.

In such an embodiment the process manifests itself as a color change, attributable to formation of the inherently colored triarylimidazolyl radical (L·). When the light source is removed, the color fades as the radicals dimerize, thus regenerating hexaarylbiimidazole (LL), as follows:

(1) 2 L·→LL

The imidazolyl radicals are useful oxidants, as schematically illustrated in Equation 2

(2) $2L\cdot + DH + H^+ \rightarrow 2LH + D^+$ where DH for example is an oxidizable substance such as a leuco dye, $D^+$ is the oxidation product (dye), and LH is the reduction product (triarylimidazole).

Thus the hexaarylbiimidazole/aromatic hydrocarbon combinations are particularly useful as visible light actuated photooxidants for a variety of substrates, including leuco dyes, and the hexaarylbiimidazole/aromatic hydrocarbon/leuco dye combinations constitute the basic ingredients of visible light actuated imaging systems, as more fully described below.

The hexaarylbiimidazole/aromatic hydrocarbon compositions are also useful as photopolymerization initiators, particularly in combination with a photooxidizable amine as defined above.

The aromatic hydrocarbon (sensitizer)

The structure of the aromatic hydrocarbon sensitizer is not critical, although some aromatic hydrocarbons are preferred to others, provided its spectral properties are as defined. Preferably, the aromatic hydrocarbon should absorb substantially within the 300 to 600 mμ absorption range 330 to 500 mμ being more preferred, and particularly 350 to 450 mμ. The aromatic hydrocarbon's molar extinction coefficient (molar absorbancy) at the wavelength chosen for sensitization should preferably be greater than the hexaarylbimidazole's and as high as practical, for example, at least 5000 and preferably at least 10,000, the higher the better since there is more absorbed energy available for transfer to the hexaarylbiimidazole.

The quantity of the aromatic hydrocarbon used in combination with the hexaarylbiimidazole will vary depending on its particular molar extinction coefficient, its efficiency in transferring the absorbed energy to the hexaarylbiimidazole, and the effect desired. Practically speaking, it will be present in normal sensitizing amounts. These amounts can be determined such that the optical density (directly proportional to the product of the extinction coefficient and the concentration) of the sensitizer is greater than the hexaarylbiimidazole's at one or more wavelengths within the chosen exposure range. It will be appreciated that even though the hexaarylbiimidazole itself may absorb to some extent at such wavelengths, the effect of the aromatic hydrocarbon sensitizer is to substantially and significantly increase the composition's total absorption of usable light during the exposure for the intended purpose. In general the actual quantity of aromatic hydrocarbon sensitizer employed will range from about 0.001 to 1 mole per mole of hexaarylbiimidazole, and preferably between about 0.01 and 0.5 mole per mole of hexaarylbiimidazole.

Aromatic hydrocarbons possessing suitable spectral properties for the purposes of this invention are those having at least three fused benzenoid rings or more, e.g., up to five such rings for reasons of availability. Representative of such aromatic hydrocarbons are the anthracene, naphthacene, pyrene and perylene classes of polynuclear aromatic hydrocarbons, including not only the parent hydrocarbons of these classes but their ring-substituted derivatives, provided that the substituents that may be present do not adversely alter the desired spectral characteristics. Readily available satisfactory substituents on the aromatic rings include chloro, lower alkyl, aralkyl in which the alkyl portion is of 1–6 carbons and the aryl portion is monocarbocyclic, alkaryl in which the aryl portion is phenyl and the alkyl portion is of 1–6 carbons, and phenyl. Examples include methyl, ethyl, propyl, isopropyl, n-butyl, isobutyl, sec. butyl, tert. butyl, benzyl, lower alkyl substituted benzyl, phenyl and lower alkyl substituted phenyl.

Representative specific aromatic hydrocarbons that may be used include anthracene, 9 - methylanthracene, 9,10-dimethylanthracene and lower alkylhomologs thereof, 9,10 - dibenzylanthracene, 9,10 - diphenylanthracene, 9,10 - dichloroanthracene, naphthacene (i.e., 3,4-dibenzanthracene), 5,6,11,12 - tetraphenylnaphthacene (rubrene), pyrene, 1 - methylpyrene, 1-tert. butyl pyrene, 1,6 - dimethylpyrene, 1,8 - dimethylpyrene, 1,3,6,8-tetramethylpyrene, 1-phenylpyrene, perylene, 3 - chloroperylene, 3 - methylperylene, 3,9 - dimethylperylene and 3-phenylperylene.

The pyrenes (including lower alkyl or phenyl substituted pyrenes) and perylenes (including chloro, lower alkyl or phenyl substituted perylenes) are preferred for their high extinction coefficients (40,000 to 60,000), particularly the perylenes for their high absorbancy at wavelengths in the 350–450 mμ region. Perylene is the preferred sensitizer. Rubrene is particularly useful where long wavelength visible light within the defined absorption range is to be employed.

The hexaarylbiimidazole

These are 2,2′,4,4′,5,5′-hexaarylbiimidazoles, sometimes called 2,4,5-triarylimidazolyl dimers which are photodissociable to the corresponding triarylimidazolyl radicals. These hexaarylbiimidazoles absorb maximally in the 255–275 mμ region, and usually show some, though lesser absorption in the 300–375 mμ region. Although the absorption bands tend to tail out to include wavelengths as high as about 420 mμ, they thus normally require light rich in the 255–375 mμ wavelengths for their dissociation.

The hexaarylbiimidazoles can be represented by the formula

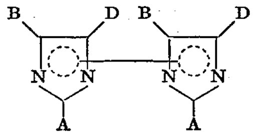

wherein A, B and D represent aryl groups which can be the same or different, carbocyclic or heterocyclic, unsubstituted or substituted with substituents that do not interfere with the dissociation of the hexaarylbiimidazole to the triarylimidazolyl radical or with the oxidation of the leuco dye, and each dotted circle stands for four delocalized electrons (i.e., two conjugated double bonds) which satisfy the valences of the carbon and nitrogen atoms of the imidazolyl rings. The B and D aryl groups can each be substituted with 0–3 substituents and the A aryl groups can be substituted with 0–4 substituents.

The aryl groups include one- and two-ring aryls, such as phenyl, biphenyl, naphthyl, pyridyl, furyl and thienyl. Suitable inert (i.e., non-interfering with the processes described herein) substituents on the aryl groups have Hammett sigma (para) values in the —.5 to 0.8 range, and are other than hydroxyl, sulfhydryl, amino, alkylamino or dialkylamino groups. Representative substituents and their sigma values, (relative to H=.00), as given by Jaffe, Chem. Rev. 53, 219–233 (1953) are: methyl (—0.17), ethyl (—0.15), t-butyl (—0.20), phenyl (0.01), butoxy (—0.32), phenoxy (—0.03), fluoro (0.06), chloro (0.23), bromo (0.23), iodo (0.28), methylthio (—0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (—0.07), and methylsulfonyl (0.73). Thus, the substituents may be halogen, cyano, lower hydrocarboyl (including alkyl, halo alkyl, cyanoalkyl, hydroxyalkyl and aryl), lower alkoxy, aryloxy, lower alkylthio, arylthio, sulfo, alkyl sulfonyl, aryl-sulfonyl, and nitro, and lower alkylcarbonyl. In the foregoing list, alkyl groups referred to therein are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range —.4 to +.4, particularly lower alkyl, lower alkoxy, chloro, fluoro, bromo and benzo groups.

In a preferred hexaarylbiimidazole class, the 2 and 2′ aryl groups are phenyl rings bearing an ortho substituent having a Hammett sigma value in the range of —.4 to +.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70–100° C.

Most preferably, the 2-phenyl ring carries only the above-described ortho group, and the 4- and 5-phenyl rings are either unsubstituted or substituted with lower alkoxy.

Preferred hexaarylbiimidazoles include 2,2′-bis(o-chlorophenyl-4,4′,5,5′-tetraphenylbiimidazole and 2,2′-bis-(o-chlorophenyl)-4,4′,5,5′-(m-methoxyphenyl(biimidazole.

Representative hexaarylbiimidazoles which may be employed in this invention include:

2,2′-bis(o-bromophenyl)-4,4′,5,5′-tetraphenylbiimidazole,
2,2′-bis(p-bromophenyl)-4,4′,5,5′-tetraphenylbiimidazole,
2,2′-bis(p-carboxyphenyl)-4,4′,5,5′-tetraphenylbiimidazole,
2,2′-bis(o-chlorophenyl)-4,4′,5,5′-tetrakis(p-methoxyphenyl)biimidazole,
2,2′-bis(p-cyanophenyl)-4,4′,5,5′-tetrakis(p-methoxyphenyl)biimidazole,
2,2′-bis(2,4-dichlorophenyl)-4,4′,5,5′-tetraphenylbiimidazole
2,2′-bis(2,4-dimethoxyphenyl)-4,4′,5,5′-tetraphenylbiimidazole,
2,2′-bis(o-ethoxyphenyl)-4,4′,5,5′-tetraphenylbiimidazole,
2,2′-bis(m-fluorophenyl)-4,4′,5,5′-tetraphenylbiimidazole,
2,2′-bis(o-fluorophenyl)-4,4′,5,5′-tetraphenylbiimidazole,
2,2′-bis(p-fluorophenyl)-4,4′,5,5′-tetraphenylbiimidazole,
2,2′-bis(o-hexoxyphenyl)-4,4′,5,5′-tetraphenylbiimidazole,
2,2′-bis(o-hexylphenyl)-4,4′,5,5′-tetrakis(p-methoxyphenyl)biimidazole,
2,2′-bis(3,4-methylenedioxyphenyl)-4,4′,5,5′-tetraphenylbiimidazole,
2,2′-bis(o-chlorophenyl)-4,4′,5,5′-tetrakis(m-methoxyphenyl)biimidazole,
2,2′-bis(o-chlorophenyl)-4,4′,5,5′-tetrakis(m-betaphenoxyethoxyphenyl)biimidazole,
2,2′-bis(2,6-dichlorophenyl)-4,4′,5,5′-tetraphenylbiimidazole,
2,2′-bis(o-methoxyphenyl)-4,4′,5,5′-tetraphenylbiimidazole,
2,2′-bis(p-methoxyphenyl)-4,4′-bis(o-methoxyphenyl)-5,5′-diphenylbiimidazole,
2,2′-bis(o-nitrophenyl)-4,4′,5,5′-tetraphenylbiimidazole,
2,2′-bis(p-phenylsulfonylphenyl)-4,4′,5,5′-tetraphenylbiimidazole,
2,2′-bis(p-sulfamoylphenyl)-4,4′,5,5′-tetraphenylbiimidazole,
2,2′-bis(2,4,6-trimethylphenyl)-4,4′,5,5′-tetraphenylbiimidazole,
2,2′-di-4-biphenylyl-4,4′,5,5′-tetraphenylbiimidazole,
2,2′-di-1-naphthyl-4,4′,5,5′-tetrakis(p-methoxyphenyl)biimidazole,
2,2′-di-9-phenanthryl-4,4′,5,5′-tetrakis(p-methoxyphenyl)biimidazole,
2,2′-diphenyl-4,4′,5,5′-tetra-4-biphenylylbiimidazole,
2,2′-diphenyl-4,4′,5,5′-tetra-2,4-xylylbiimidazole,
2,2′-di-3-pyridyl-4,4′,5,5′-tetraphenylbiimidazole,
2,2′-di-3-thienyl-4,4′,5,5′-tetraphenylbiimidazole,
2,2′-di-o-tolyl-4,4′,5,5′-tetraphenylbiimidazole,
2,2′-di-p-tolyl-4,4′-di-o-tolyl-5,5′-diphenylbiimidazole,
2,2′-di-2,4-xylyl-4,4′,5,5′-tetraphenylbiimidazole,
2,2′,4,4′,5,5′-hexakis(p-benzylthiophenyl)biimidazole,
2,2′,4,4′,5,5′-hexa-1-naphthylbiimidazole,
2,2′,4,4′,5,5′-hexaphenylbiimidazole,
2,2′-bis(2-nitro-5-methoxyphenyl)-4,4′,5,5′-tetraphenylbiimidazole, and
2,2′-bis(o-nitrophenyl)-4,4′,5,5′-tetrakis(m-methoxyphenyl)biimidazole.
2,2′-bis(2-chloro-5-sulfophenyl)-4,4′,5,5′-tetraphenylbiimidazole.

The hexaarylbiimidazoles are conveniently obtained by known methods as more particularly described by British Pat. 997,396 and by Hayashi et al., Bull. Chem. Soc. Japan, 33, 565 (1960) and Cescon & Dessauer Appln. Ser. No. 728,781, filed May 13, 1968, now U.S. Pat. 3,445,-234. The preferred method, involving oxidative dimerization of the corresponding triarylimidazole with ferricyanide in alkali, generally yields the 1-2′-hexaarylbiimidazoles, although other isomers, such as the 1,1′,1,4′,2,2′, 2,4′ and 4,4′-hexaarylbiimidazoles are sometimes also obtained admixed with the 1,2′-isomer. For the purposes of this invention, it is immaterial which isomer is employed so long as it is photo-dissociable to the triarylimidazole radical, as discussed above.

The optional leuco dye

The leuco dye together with the hexaarylbiimidazole and the aromatic hydrocarbon forms one embodiment of this invention. By the term "leuco dye" is meant the colorless (i.e., the reduced) form of a dye compound which may be oxidized to its colored form by the triarylimidazolyl radical.

Leuco dyes which may be oxidized to color by the triarylimidazolyl radicals generated from the compositions of this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo - p,p′ - biphenols, 2(p-hydroxyphenyl) - 4,5 - diphenylimidazoles, phenethylanilines and the like. These classes of leuco dyes are described in greater detail in Cescon & Dessauer U.S. application Ser. No. 728,781, filed May 13, 1968, now U.S. 3,445,234; Cescon, Dessauer & Looney U.S. Pat. 3,423,-427; Cescon, Dessauer & Looney U.S. application Ser. No. 290,583, filed June 26, 1963, now U.S. 3,449,379; Read U.S. Pat. 3,395,018 and Read U.S. Pat. 3,390,997.

The preferred leucos are the aminotriarylmethanes. Preferably the aminotriarylmethane is one wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio. Preferably the third aryl group is the same as the first two.

Particularly preferred aminotriarylmethanes have the following structual formula:

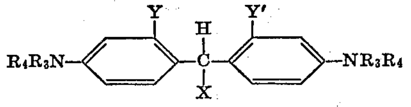

wherein $R_3$ and $R_4$ are selected from lower alkyl (preferably ethyl) or benzyl, Y and Y′ are lower allkyl (preferably methyl) and X is selected from

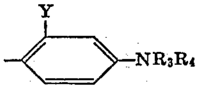

p-methoxyphenyl, 2-thienyl, phenyl, 1-naphthyl, 2,3-dimethoxyphenyl, 3,4-methylenedioxyphenyl, or p-benzylthiophenyl. Preferably X is selected from

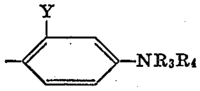

phenyl, 1-naphthyl, or p-benzylthiophenyl.

These triarylmethanes are employed as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 0.33 mole to 1 mole per amino group. The term "strong acid" as used herein is defined as an acid which forms a salt with an anilino amino group.

Specific examples of the aminotriarylmethanes employed in this invention are:

bis(4-amino-2-butylphenyl)(p-dimethylaminophenyl) methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl) methane
bis(4-amino-3,5-diethylphenyl)(o-ethoxyphenyl) methane
bis(4-amino-3,5-diethylphenyl)(p-methoxyphenyl) methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl) methane
bis(p-benzylethylaminophenyl)(p-chlorophenyl) methane
bis(p-benzylethylaminophenyl)(p-diethylaminophenyl) methane
bis(p-benzylethylaminophenyl)(p-dimethylaminophenyl) methane
bis(4-benzylethylamino-o-tolyl)(p-methoxyphenyl) methane
bis(p-benzylethylaminophenyl)-phenylmethane
bis(4-benzylethylamino-o-tolyl)(o-chlorophenyl) methane
bis(4-benzylethylamino-o-tolyl)(p-diethylaminophenyl) methane
bis(4-benzylethylamino-o-tolyl)(4-diethylamino-o-tolyl) methane bis(4-benzylethylamino-o-tolyl)(p-dimethylaminophenyl)methane
bis[2-chloro-4-(2-diethylaminoethyl)ethylaminophenyl] (o-chlorophenyl)methane
bis[p-bis(2-cyanoethyl)aminophenyl]phenplmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(p-dibutylaminophenyl)(p-diethylaminophenyl) methane
bis(4-diethylamino-2-butoxyphenyl)(p-diethylaminophenyl)methane
bis(4-diethylamino-2-fluorophenyl)-o-tolylmethane
bis(p-diethylaminophenyl)(p-aminophenyl)methane
bis(p-diethylaminophenyl)(4-anilino-1-naphthyl) methane
bis(p-diethylaminophenyl)(m-butoxyphenyl)methane
bis(p-diethylaminophenyl)(o-chlorophenyl)methane
bis(p-diethylaminophenyl)(p-cyanophenyl)methane
bis)p-diethylaminophenyl)(2,4-dichlorophenyl)methane
dis(p-diethylaminophenyl)(4-diethylamino-1-naphthyl) methane
bis(p-diethylaminophenyl)(p-dimethylaminophenyl) methane
bis(p-diethylaminophenyl)(4-ethylamino-1-naphthyl) methane
bis(p-diethylaminophenyl)2-naphthylamethane
bis(p-diethylaminophenyl)(p-nitrophenyl)methane
bis(p-diethylaminophenyl)2-pyridylmethane
bis(p-diethylamino-m-tolyl)(p-diethylaminophenyl) methane
bis(4-diethylamino-o-tolyl)(o-chlorophenyl)methane
bis(4-diethylamino-o-tolyl)(p-diethylaminophenyl) methane
bis(4-diethylamino-o-tolyl)(p-diphenylaminophenyl) methane
bis(4-diethylamino-o-tolyl)phenylmethane
bis(4-dimethylamino-2-bromophenyl)phenylmethane
bis(p-dimethylaminophenyl)(4-anilino-1-naphthyl) methane
bis(p-dimethylaminophenyl)(p-butylaminophenyl) methane
bis(p-dimethylaminophenyl)(p-sec. butylethylaminophenyl)methane
bis(p-dimethylaminophenyl)(p-chlorophenyl)methane
bis(p-dimethylaminophenyl)(p-diethylaminophenyl) methane
bis(p-dimethylaminophenyl)(4-dimethylamino-1-naphthyl)methane
bis(p-dimethylaminophenyl)(6-dimethylamino-m-tolyl) methane
bis(p-dimethylaminophenyl)(4-dimethylamino-o-tolyl)methane
bis(p-dimethylaminophenyl)(4-ethylamino-1-naphthyl) methane
bis(p-dimethylaminophenyl)(p-hexyloxyphenyl)methane
bis(p-dimethylaminophenyl)(p-methoxyphenyl) methane
bis(p-dimethylaminophenyl)(5-methyl-2-pyridyl) methane
bis(p-dimethylaminophenyl) 2-quinolylmethane
bis(p-dimethylaminophenyl) o-tolylmethane
bis(p-dimethylaminophenyl)(1,3,3-trimethyl-2-indolinylidenemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl) 1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane bis(4-ethylamino-m-tolyl)(p-methoxyphenyl)methane
bis(4-ethylamino-m-tolyl)(p-dimethylaminophenyl) methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl](o-chlorophenyl) methane
bis[p-(bis(2-hldroxyethyl)aminophenyl]4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tri(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane
bis(2-bromo-4-diethylaminophenyl)phenylmethane
bis(2-butoxy-4-diethylaminophenyl)phenylmethane
bis(4-diethylamino-o-tolyl)(p-methoxyphenyl) methane
bis(4-diethylamino-2-methoxyphenyl)(p-nitrophenyl) methane
bis(4-diethylamino-1-naphthyl)(4-diethylamino-o-tolyl) methane
bis(4-diethylamino-o-tolyl)1-naphthylmethane
bis(4-diethylamino-o-tolyl)phenylmethane
tris(4-dimethylamino-2-chlorophenyl)methane
bis(4-dimethylamino-2,5-dimethylphenyl) phenylmethane
bis(4-dimethylamino-o-tolyl)(o-bromophenyl)methane
bis(4-ethylbenzylamino-o-tolyl)(p-methoxyphenyl) methane
tris(p-dioctylamino-o-tolyl)methane
bis(4-diethylamino-o-tolyl)(4-methoxy-1-naphthyl) methane
bis(4-diethylamino-o-tolyl)(3,4,5-trimethoxyphenyl) methane
bis(4-diethylamino-o-tolyl)(p-hydroxyphenyl)methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methyl-sulfonanilide
4-[bis(4-diethylamino-o-tolyl)methyl]-p-tolyl-sulfonilide
bis(4-diethylamino-o-tolyl)-p-nitrophenyl methane
bis(4-diethylamino-o-tolyl)(2-diethylamino-4-methyl-5-thiazolyl) methane
bis(4-diethylamino-o-tolyl)(2-diethylamino-5-methyl-6-benzoxazolyl) methane
bis(4-diethylamino-o-tolyl)(2-diethylamino-5-methyl-6-benzothiazolyl) methane
bis(4-diethylamino-o-tolyl)(1-ethyl-2-methyl-3-indolyl) methane
bis(4-diethylamino-o-tolyl)(1-benzyl-2-methyl-3-indolyl) methane
bis(4-diethylamino-o-tolyl)(1-ethyl-2-methyl-5-methoxyl-3-indolyl)methane
bis(1-o-xylyl-2-methyl-3-indolyl)(4-diethylamino-o-tolyl)methane
bis(4-diethylamino-o-tolyl)(1-ethyl-5-indolinyl)methane
bis(1-isobutyl-6-methyl-5-indolinyl)(4-diethylamino-o-tolyl)methane
bis(4-diethylamino-o-tolyl)(8-methyl-9-julolindinyl) methane
bis(4-diethylamino-2-acetamidophenyl)(4-diethyl-amino-o-tolyl)methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl)methane
bis(4-diethylamino-o-tolyl)(p-benzylthiophenyl) methane
bis(4-diethylamino-o-tolyl)(4-isopropylthio-3-methylphenyl)methane
bis(4-diethylamino-o-tolyl)(4-chlorobenzylthiophenyl) methane
bis(4-diethylamino-o-tolyl)(2-furyl)methane
bis(4-diethylamino-o-tolyl)(3,4-methylenedioxyphenyl) methane
bis(4-diethylamino-o-tolyl)(3,4-dimethoxyphenyl) methane
bis(4-diethylamino-o-tolyl)(3-methyl-2-thienyl) methane
bis(4-diethylamino-o-tolyl)(2,4-dimethoxyphenyl) methane
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane
bis(4-dibutylamino-o-tolyl)2-thienylmethane
bis(4-diethylamino-2-ethylphenyl)(3,4-methylene-dioxyphenyl)methane
bis(4-diethylamino-2-fluorophenyl)(p-benzylthio-phenyl)methane
bis(4-diethylamino-2-fluorophenyl)(3,4-methylene-dioxyphenyl)methane
bis(4-diethylamino-2-fluorophenyl)(p-benzylthio-methane
bis(4-diethylamino-o-tolyl)2-thienylmethane
bis(4-dimethylamino-2-hexylphenyl)(p-butylthiophenyl) methane
bis[4-(N-ethylanilino)-o-tolyl](3,4-dibutoxyphenyl) methane
bis[4-bis(2-hydroxyethyl)amino-2-fluorophenyl](p-benzylthiophenyl)methane
bis(4-diethylamino-o-tolyl)-p-chlorophenyl methane
bis(4-diethylamino-o-tolyl)-p-bromophenyl methane
bis(4-diethylamino-o-tolyl)p-fluorophenyl methane
bis(4-diethylamino-o-tolyl)-p-tolyl methane
bis(4-diethylamino-o-tolyl)-4-methoxy-1-naphthyl methane
bis(4-diethylamino-o-tolyl)-3,4,5-trimethoxyphenyl methane
bis(4-diethylamino-o-tolyl)-p-hydroxpyhenyl methane
bis(4-diethylamino-o-tolyl)-3-methylthienyl methane

Preparation of compositions and other components

The hexaarylbiimidazole and aromatic hydrocarbon sensitizer are conveniently carried in an inert common solvent in proportions recited above and in amounts providing at least about 0.5% by weight of the hexaarylbiimidazole. To provide color-forming or imaging compositions, one or more leuco dyes as defined above are added, usually in amounts providing from 0.1 to 10 moles of leuco dye per mole of hexaarylbiimidazole, more usually from 0.5 to 2 moles and preferably about 1 mole, per mole of hexaarylbiimidazole. Still other components may be present as described further below.

Solvents

In general, solvents are employed which are volatilizing at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene, toluene; ketones such as acetone, methyl ethyl ketone, 3-pentanone; aliphatic halocarbons such as methylene chloride, chloroform, 1,1,2-trichloroethane, 1,1,2,2-tetrachloroethane, 1,1,2-trichloroethylene; miscellaneous solvents such as dimethylsulfoxide, pyridine, tetrahydrofuran, dioxane, dicyanocyclobutane, 1-methyl-2-oxohexamethyleneimine; and mixtures of these solvents in various proportions as may be required to attain solutions.

In imaging uses such solvents provide a fluid medium for convenient application of the light-sensitive composition to substrates. To obtain the final coated article the solvent is normally removed as, e.g., by evaporation. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an amino leuco form of a dye on cellulosic substrates, and serves as a suitable solvent.

Binders

Polymeric binders may also be present in the light-sensitive compositions to thicken them or adhere them to substrates. Binders can also serve as a matrix for the color-forming composition and the mixture may be cast, extruded or otherwise formed into unsupported imageable films. Light-transparent and film-forming polymers, are preferred. Examples are ethyl cellulose, polyvinyl alcohol, polyvinyl chloride, polystyrene, polyvinyl acetate, poly(methyl methacrylate), cellulose acetate, cellulose butyrate, cellulose acetate butyrate, cellulose nitrate, chlorinated rubber, copolymers of the above vinyl monomers, and gelatin. Binder or matrix amounts vary from about 0.5 part to about 200 parts by weight per part of combined weight of leuco dye and hexaarylbiimidazole. In general, from 0.5 to 10 parts are used as adheisve or thickener, while higher amounts are used to form the unsupported films. With certain polymers, it may be desirable to add a plasticizer to give flexibility to the film or coating. Plasticizers include the polyethylene glycols such as the commercially available carbowaxes, and related materials, such as substituted phenol-ethylene oxide adducts, for example the polyethers obtained from o-, m- and p-cresol, o-, m- and p-phenylphenol and p-nonylphenol, including commercially available materials such as the Igepal alkyl phenoxy polyoxyethylene ethanols. Other plasticizers are the acetates, propionates, butyrates and other carboxylate esters of ethylene glycol, diethyleneglycol, glycerol, pentaerythritol and other polyhydric alcohols, and alkyl phthalates and phosphates such as dimethyl phthalate, diethyl phthalate, dioctyl phthalate, tributyl phosphate, diethyl phthalate, dioctyl phthalate, tributyl phosphate, trihexyl phosphate, trioctyl phosphate, triphenyl phosphate, tricresyl phosphate and cresyl diphenyl phosphate.

Photopolymerizable compositions

Another embodiment of this invention is a photopolymerizable composition comprising the hexaarylbiimidazole/aromatic hydrocarbon sensitizer combination as defined above and an addition-polymerizable ethylenically unsaturated compound. Such composition may include one or more other ingredients such as a carrier solvent or a binder as described above, or a polymerization aid such as an electron-donating free radical generator as disclosed in Belgian Pat. 681,944.

The addition-polymerizable component includes low and high-molecular-weight compounds, including polymeric compounds, which have at least one polymerizable ethylenic group, preferably a terminal $CH_2{=}C$ group, free to polymerize. Thus this component may be a relatively simple monomer or it may be a polymer having cross-linkable ethylenic groups. Normally its molecular weight is below about 1500 and it contains two or more ethylenic, particularly vinylic groups, for crosslinking. Preferred monomers are the terminally unsaturated carboxylic ester monomers, particularly alpha-methylene carboxylic acid esters of polyols, e.g., ethylene glycol diacrylate, diethylene glycol diacrylate, triethylene glycol diacrylate, glycerol diacrylate, glycerol triacrylate, ethylene glycol dimethacrylate 1,2-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, pentaerythritol triacrylate; the bisacrylates and methacrylates of polyethylene glycols of molecular weight 100–500, and the like.

The addition-polymerizable component will ordinarily be present in an amount of 10 to 100 moles/mole of hexaarylbiimidazole, and more usually 15 to 25 moles/mole. With these latter proportions, a plasticizer, usually 10–50 percent by weight based on weight of monomer, may be employed.

Preferred photopolymerizable compositions of this invention also include as polymerization aid or co-initiator a photooxidizable amine such as triethanolamine, N-phenyl glycine, N,N-diethylaniline, N,N-dimethylglycine, tri-n-hexylamine, dimethyl cyclohexylamine, diethylcyclohexylamine, N,N,N′,N′-tetramethylethylene diamine, tetramethylethylene diamine, 2-dimethylaminoethanol, 3-dimethylamino-1-propanol, 2-diethanolamine or any aminotriarylmethane leuco dye, particularly those containing dialkylamino groups, described above as useful herein as color generators, in an amount described for the leuco dye.

With an aminotriarylmethane leuco dye present in color-forming amount, the photopolymerizable compositions are capable of forming color as well as polymer on being irradiated according to the method of the invention. The polymerization rate may often be speeded up by employing another free radical generator or chain transfer agent, in amount ranging from 0.01 to 0.1 mole/mole leuco dye, such as N-phenylglycine, 1,1-dimethyl-3,5-diketocyclohexane, or organic thiols, e.g., 2-mercaptobenzothiazole, 2-mercaptobenzoxazole, 2-mercaptobenzimidazole, pentaerythritol tetrakis (mercaptoacetate), 4-acetamidothiophenol, mercaptosuccinic acid, dodecanethiol, beta-mercaptoethanol, or other organic thiol.

Through exposure control, e.g., by altering the intensity and time of exposure, as more fully described in Cescon, Cohen & Dessauer, U.S. Appln. Ser. No. 740,103, filed June 26, 1968 and assigned to the assignee herein, the color-forming and polymerization reactions can be controlled so as to produce substantially colored or uncolored compositions. Thus polymerization fixed images can be produced in imaging applications by sequentially applied exposures that substantially completely polymerize the composition while controlling the amount of color produced in adjacent areas.

Other sensitizers

The spectral sensitivity of the hexaarylbiimidazoles may be extended further to visible light by also incorporating into the above-described compositions a visible-light-absorbing energy-transferring agent such as Erythrosin B, Rose Bengal or other phthalein dye disclosed in Walker, U.S. Appln. Ser. No. 654,720, filed July 20, 1967, now U.S. Pat. 3,563,750; Acridine Orange, Diethyl Orange or other aminoacridine dye disclosed in Cohen, U.S. Appln. Ser. No. 654,721, filed July 20, 1967, now U.S. Pat. 3,563,751; 3,3′-diethyl-4,5,4,5′-dibenzoxacarbocyanine p-toluene sulfonate, 3,3′-diethyloxaselenacarbocyanine iodide, 3,3′-di-n-butyl-9-methylthiacarbocyanine iodide, 3,3′-diethyl thiaselenacarbocyanine iodide, 3,3′-diethyl selenacarbocyanine iodide or the like carbocyanine dye disclosed in Cohen, U.S. Appln. Ser. No. 654,676, filed July 20, 1967, now U.S. 3,554,753; or 7-diethylamino-4-methylcoumarin, 7 - dimethylamino-4-methylcoumarin, or the like coumarin disclosed in James & Witterholt, U.S. Ser. No. 622,526, filed Mar. 13, 1967, now U.S. 3,533,797, said applications being assigned to the assignee herein.

Particularly advantageous for providing extended spectral sensitivity are the combinations of perylene with Acridine Orange, and perylene with 7-dimethylamino-4-methylcoumarin.

Substrates

For imaging uses, the compositions of this invention may be coated upon or impregnated in substrates following known techniques. Substrates include materials commonly used in the graphic arts and in decorative applications such as paper ranging from tissue paper to heavy cardboard, films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polyvinylchloride; textile fabrics; glass, wood and metals. The composition, usually as a solution in a carrier solvent described above may be sprayed, brushed, applied by a roller or an immersion coater, flowed over the surface, picked up by immersion or spread by other means, and the solvent evaporated.

Light sources

Any convenient source providing wavelengths in the ultraviolet and visible region of the spectrum that overlap the aromatic hydrocarbon sensitizer's absorption bands may be used to activate the light-sensitive compositions for triarylimidazolyl radical formation, image formation, and photopolymerization initiation. The light may be natural or artificial, monochromatic or polychromatic, incoherent or coherent, and the high efficiency should correspond closely in wavelengths to the aromatic hydrocarbon sensitizer's principal absorption bands and should be sufficiently intense to activate a substantial proportion of the sensitizer. Also it may often be advantageous to increase the speed of triarylimidazolyl radical and image formation by employing the longer wavelength light range in accord with this invention in conjunction with the ultraviolet light range normally required to dissociate the dimer.

Conventional light sources include fluorescent lamps, mercury, metal additive and arc lamps providing narrow or broad light bands centered near 360, 420, 450 and 500 mμ wavelengths. Coherent light sources are the pulsed nitrogen-, argon ion- and ionized neon-lasers whose emissions fall within or overlap the ultraviolet or visible absorption bands of the sensitizer.

Ultraviolet and visible emitting cathode ray tubes widely useful in printout systems for writing on photosensitive materials are also useful with the subject compositions. These in general involve an ultraviolet or visible-emitting phosphor internal coating as the means for converting electrical energy to light energy and a fiber optic face plate as the means for directing the radiation to the photosensitive target. Representative phosphors that emit strongly and substantially overlap the near ultraviolet-absorption and visible absorption characteristics of the subject compositions include the P4B (emitting at 300–550 mμ, peaking at 410 mμ) P16 (330–460 mμ, peaking at 380 mμ) and P22B (390–510 mμ, peaking at 450 mμ) types. Other phosphors which may be used are the P11 (400–560 mμ, peaking at 460 mμ) and $ZrP_2O_7$ types. (The Electronic Industries Association, New York, New York, assigns P-numbers and provides characterizing information on the phosphors; phosphors with the same P-number have substantially identical characteristics.)

Images may be formed by writing with a beam of the activating light or by exposing to such light a selected area behind a negative, stencil, or other relatively opaque pattern. The negative may be silver on cellulose acetate or polyester film or one in which its opacity results from aggregations of areas having different refractive indices. Image formation may also be effected in conventional diazo printing apparatus, or in a thermography device, provided the instrument emits some of its light in the desired wavelength range. A piece of onionskin paper which bears typewriting, for example, can serve as a master from which copies are made. The light exposure time may vary from a fraction of a second to several minutes, depending upon the intensity and spectral energy distribution of the light, its distance from the composition, the nature and amount of the composition available, and the intensity of color in the image desired.

The following examples illustrate the invention embodiments in greater detail:

EXAMPLE 1

Compositions (numbered 1, 2, 3 and 4) containing the ingredients set forth following were prepared as solutions in acetone, a convenient carrier solvent:

| | Molarity ×10² | | | |
|---|---|---|---|---|
| Composition | 1[a] | 2[b] | 3[b] | 4[b] |
| Component: | | | | |
| 2,2′bis(o-chlorophenyl)-4,4′,4,5′-tetraphenyl biimidazole (o-ClHABI) | 3.0 | 3.0 | 0.0 | 0.0 |
| Tris(N,N-diethylamino-o-tolyl) methane (leuco dye) | 1.5 | 1.5 | 1.5 | 1.5 |
| p-Toluenesulfonic acid | 3.0 | 3.0 | 3.0 | 3.0 |
| Rubrene (aromatic hydrocarbon sensitizer) | 0.04 | 0.0 | 0.04 | 0.0 |

[a] The mole ratios are: biimidazole=1/leuco=0.5/acid=1/sensitizer=0.0133.

[b] The omitted components in these compositions numbered 2, 3 and 4 are to show that both the biimidazole and sensitizer are needed for visible light activation and that the sensitizer itself is not a photooxidant for the leuco dye.

For testing, each solution was mixed with 6.8% by weight of a polyethylene ether having an average molecular weight of about 550 as a plasticizer; and spotted on 1″ x 3″ strips of Whatman No. 1 filter paper. After the acetone had evaporated, the papers were irradiated, by contact flashing with a Xenon flash lamp (HiCo Lite, emitting ultraviolet and visible light above 200 mμ and approximating ordinary sun light), directly and through a series of sharp cutoff filters, as designated below, which transmit wavelengths longer than that specified but substantially no shorter wavelengths.

| | Available as Corning filter No./glass No. | Cutoff wavelength, mμ |
|---|---|---|
| Filter: | | |
| 1 | 3-74 | 370 |
| 2 | 3-72/3387 | 430 |
| 3 | 3-71/3385 | 470 |
| 4 | 3-69/3486 | 520 |
| 5 | 2-62/2418 | 560 |

The results of the test are tabulated below:

VISIBLE-LIGHT-SENSITIZED BIIMIDAZOLE PHOTOLYSIS

| Composition | Biimidazole present | Sensitizer present | Filter/color formation | | | | |
|---|---|---|---|---|---|---|---|
| | | | None 300 mu→ | 1 370→ | 2 470→ | 3 520→ | 4 560→ |
| 1 | Yes | Yes | Intense | Intense | Intense | Medium | Faint. |
| 2 | Yes | No | do | Light | Faint | None | None. |
| 3 | No | Yes | None | | | | |
| 4 | No | No | do | | | | |

The more effective the system to generate triarylimidazolyl radicals under a given light stimulus, the deeper the color, with intense>medium>light>faint blue.

This test demonstrates biimidazole photolysis to triarylimidazolyl radicals through reaction of the radicals with a triarylmethane leuco dye, evidenced by formation of the triarylmethane dye's characteristic blue color.

These results show that (1) the biimidazole is the photooxidant and its activation in the absence of sensitizer requires relatively short wavelength light, (2) the sensitizer extends the spectral sensitivity of the biimidazole towards longer wavelength light, permitting it to effectively utilize near ultraviolet and blue (visible) light for activation.

EXAMPLES 2–4

The following light sensitive coating composition was prepared:

| Ingredient: | Parts by weight |
|---|---|
| Acetone | 46 |
| Cellulose acetate butyrate (a thermoplastic resin binder) | 6 |
| p-Phenylphenol 5.9 moles ethylene oxide (i.e., $C_6H_5C_6H_4O(CH_2CH_2O)5.9H$) (plasticizer)- | |
| 2,2′-bis(o-chlorophenyl)-4,4′,5,5′-tetrakis-(m-methoxyphenyl biimidazole | 0.624 |
| Tris(p-N,N-dimethylamino-o-tolyl) methane (leuco dye) | 0.30 |
| p-Toluenesulfonic acid monohydrate | 0.342 |
| Perylene (sensitizer) | 0.02 |

The solution was applied to bleached-sulfite roll stock paper and the acetone allowed to evaporate to give a 0.5 mil thick coating. Paper coated with the same composition but without the sensitizer was similarly prepared for comparison.

The coated papers were exposed to long wavelength light at 1 mw./cm.$^2$ intensity for 1 to 20 seconds under each of the following conditions:

(a) With a spectrosensitometer containing a monochromator set at 436 mμ;

(b) With a cathode ray tube containing a P22 blue phosphor emitting principally at 400 to 450 mμ;

(c) With a Xenon lamp in conjunction with Corning® filters 0.54 and 7–59 which permit peak transmittance at 420 to 440 mμ.

During such exposures the optical densities of the color develop a 0.3 reflectance optical density.
Quantometer. The results are expressed below in terms of the relative color-forming speeds of the sensitized and unsensitized (control) formulations with speed defined as 1000 times the reciprocal of the exposure required to develop a 0.3 reflectance optical density.

| Example | Light source and wavelength | Relative speed control=1 |
|---|---|---|
| 2 | Spectrosensitometer, 436 mμ | 12 |
| 3 | CRT, 400–450 mμ | 3 |
| 4 | Xenon lamp and filters, 420–440 mμ | 2.5 |

In separate experiments it was found that when the hexaarylbiimidazole or leuco dye were omitted, essentially no color formation was observed. Thus the results demonstrate the sensitized hexaarylbiimidazole photolysis and subsequent leuco dye oxidation at the indicated wavelengths.

In further comparison, the color-forming speed of the perylene sensitized composition at 436 mμ is 1.5 times the speed of the unsensitized control at 350 to 370 mμ, its region of maximum sensitivity, which indicates increased color forming efficiency for the perylene composition.

EXAMPLE 5

Coated paper as in Examples 2 to 4 was prepared except that the tris(p-N,N-diethylamino-o-tolyl) methane was replaced by an equimolar amount of an equimolar mixture of bis(p-N,N-diethylamino-o-chlorophenyl)(p-chlorophenyl)methane and bis(p-N,N-diethylamino-o-tolyl)(p-isopropylthio-m-tolyl)methane. This composition yields neutral (gray black) shades on exposure and shows color-forming speeds several times faster than the unsensitized control at wavelengths in the 400 to 450 mμ range.

EXAMPLE 6

A sensitized coated paper was prepared essentially as described in Examples 2–4 except that pyrene (0.08 part) replaced perylene as the sensitizer.

Pyrene absorbs maximally in the 300 to 350 mμ region, where the hexaarylbiimidazole also shows significant but much lesser absorption (e.g., pyrene's extinction coefficient, 50,000, is 10 times the biimidazole's at 335 mμ). The pyrene composition's enhanced spectral sensitivity in this range is shown by the fact that it forms color 70% faster than the control when irradiated with a Xenon lamp through a Corning® filter No. 7–54, which transmits in the 240 to 400 mμ region.

EXAMPLES 7–13

Sensitized coated papers were prepared as in Examples 2–4 except that a sensitizer (0.3 part) as identified below was used in place of perylene. The color-forming speeds relative to the unsensitized control were determined as described in the previous examples by irradiating with a Xenon lamp through Corning® filter No. 7–54 (transmitting in the 240–400 mμ region), 7–59 (transmitting at 310–460 mμ) or 3–71 (transmitting above 470 mμ). The results follow:

| Example | Sensitizer and max. absorption range, mμ | | Irridation range, mμ | Speed, relative to control=1 |
|---|---|---|---|---|
| 7 | Anthracene | 320–380 | 240–400 | 1.3 |
| 8 | 9-methylanthracene | 350–390 | 310–460 | 1.4 |
| 9 | 9,10-dichloroanthracene. | 360–400 | 240–400 | 1.5 |
| 10 | 9,10-dibenzylanthraene. | 340–400 | 310–460 | 1.6 |
| 11 | 9,10-diphenylanthracene. | 330–395 | 240–400 | 2.0 |
| 12 | do | 330–395 | 310–460 | 2.5 |
| 13 | 5,6,10,11-tetraphenyl naphthacene (Rubrene). | 480–525 | [1] 470 | 3.7 |

[1] Above.

It will be noted that the color-forming speed increases are obtained even though the irradiation range overlaps the wavelength range where the unsensitized system shows high sensitivity to light.

Still greater speed improvements may be obtained with monochromatic light at wavelengths where the sensitizers show maximum light absorption.

EXAMPLES 14–18

Coated papers with enhanced spectral sensitivity were prepared as described in Examples 2–4 except that binary sensitizer compositions as identified below, involving a relatively short wavelength sensitizer in combination with a relatively long wavelength sensitizer, were used in place of perylene.

| Example | Sensitizer | Quantity, part by weight | Range of max. sensitization, μ |
|---|---|---|---|
| 14 | Perylene plus Rubrene | 0.02; 0.02 | 380 to 530. |
| 15 | Perylene plus Pyrene | 0.02; 0.04 | 330 to 450. |
| 16 | 9,10-diphenylanthracene plus 7-diethylamino 4-methylcoumarin. | 0.08; 0.09 | 330 to 400. |
| 17 | Perylene plus 7-diethylamino-4-methylcoumarin. | 0.02; 0.09 | 350 to 450. |
| 18 | Perylene plus Diethyl orange | 0.02; 0.02 | 380 to 520. |
| Control | None | | 350 to 370. |

EXAMPLE 19

A sensitized formulation containing 0.35 g. of 2,2'-(o-chlorophenyl)-4,4',5,5'-tetrakis (m-methoxyphenyl)biimidazole, 0.228 g. of tris(p-N,N-diethylamino-o-tolyl) methane, 0.124 g. of p-toluenesulfonic acid, 2.5 g. of pentaerythritol triacrylate, 1.1 g. of poly(methyl methacrylate), 0.01 g. of perylene and 5 ml. of acetone was coated to a 5 mil wet thickness on 1 mil "Mylar" polyester film, warmed slightly under an IR lamp to evaporate the acetone, and laminated with a 4 mil "Mylar" cover sheet.

This film laminated composition is sensitive to ultraviolet and visible light out to about 500 mμ and forms blue colored and/or polymerized areas on such exposure depending on the light intensity. It shows enhanced spectral sensitivity in the 400 to 500 mμ range; for example, irradiating it in a spectrosensitomer at 436 mμ at intensities between 5 and 100 mw./cm.$^2$ produces blue colored polymerized areas 15 times faster than the unsensitized control at this wavelength. Exposed at intensities 1 mw./cm.$^2$ or less at 436 mμ while being heated at 70° C., the composition polymerizes substantially completely with little or no color formation.

EXAMPLE 20

A sensitized formulation containing 0.32 g. of 2,2'-(o-chlorophenyl) - 4,4',5,5' - tetrakis (m-methoxyphenyl)biimidazole, 0.13 g. tris(N,N-diethylamino-o-tolyl) methane, 0.13 g. of p-toluenesulfonic acid, 0.005 g. of N-phenyl glycine, 1.32 g. of triethylene glycol diacrylate, 1.32 g. of cellulose acetate butyrate (available from Eastman as EAB 171–15), 0.01 g. of perylene, and 15 ml. of acetone was cast on and laminated between "Mylar" polyester film as described in Example 19.

This film laminated composition yields blue and/or polymerized areas on exposure to ultraviolet and visible light out to about 500 mμ, depending on the light intensity. For example at 436 mμ at intensities of at least 5 mw./cm.$^2$ it produces deep blue polymerized areas. At intensities less than 2 mw./cm.$^2$ it produces substantially completely polymerized uncolored areas. The polymerization speed under these conditions is 70% faster than that of the unsensitized control.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A photoactivatible composition comprising an admixture of
   (A) a hexaarylbiimidazole that has its principal light absorption bands in the ultraviolet region of the electromagnetic radiation spectrum and is dissociable to triarylimidazolyl radicals on irradiation with such absorbable ultraviolet light, and
   (B) an aromatic hydrocarbon that has at least three fused benzenoid rings, said aromatic hydrocarbon being unsubstituted or ring-substituted in which the substituents are chloro, lower alkyl, aralkyl in which the alkyl portion is of 1–6 carbons and the aryl portion is monocarbocyclic, alkaryl in which the aryl portion is phenyl and the alkyl portion is of 1–6 carbons, or phenyl and having its principal light absorption band in the near ultraviolet or visible regions of the electromagnetic radiation spectrum; said aromatic hydrocarbon being present in a sensitizing amount.

2. The composition of claim 1 wherein:
   the hexaarylbiimidazole absorbs maximally in the 255–275 mμ region of the electromagnetic radiation spectrum, and wherein
   the aromatic hydrocarbon absorbs substantially in the 300–600 mμ region of the electromagnetic radiation spectrum.

3. The composition of claim 2 wherein the hexaarylbiimidazole is a 2,2',4,4',5,5' - hexaphenylbiimidazole in which the phenyl groups can contain substituents which do not interfere with the photo-dissociation of the hexaarylbiimidazole and which have Hammett sigma values in the —.5 to 0.8 range; and wherein the aromatic hydrocarbon is selected from anthracene, naphthacene, pyrene and perylene, and ring-substituted derivatives thereof.

4. The composition of claim 3 wherein:
   the phenyl groups of the 2,2',4,4',5,5' - hexaphenylbimidazole can contain substituents selected from lower alkyl, lower alkoxy, chloro, fluoro, bromo and benzo; and wherein
   the aromatic hydrocarbon is selected from anthracene, 9-methylanthracene, 9,10 - dimethylanthracene 9,10-dibenzylanthracene, 9,10 - diphenylanthracene, 9,10-dichloroanthracene, naphthacene, 5,6,11,12 - tetraphenylnaphthacene, pyrene, 1-methylpyrene, 1-tert. butyl pyrene, 1,6-dimethylpyrene, 1,8-dimethylpyrene, 1,3,6,8 - tetramethylpyrene, 1 - phenylpyrene, perylene, 3-chloroperylene, 3-methylperylene, 3,9-dimethylperylene or 3-phenylperylene.

5. The composition of claim 4 wherein:
   the 2 and 2' phenyl groups of the hexaarylbiimidazole each contains an ortho substituent selected from lower alkyl, lower alkoxy, chloro, fluoro or bromo and wherein the 4,4',5 and 5' phenyl groups of the hexaarylbiimidazole are either unsubstituted or contain up to three lower alkoxy groups each; and wherein
   the aromatic hydrocarbon is selected from pyrene, 1-methylpyrene, 1 - tert.butyl pyrene, 1,6 - dimethylpyrene, 1,8-dimethylpyrene, 1-phenylpyrene, perylene, 3 - chloroperylene, 3 - methylperylene, 3,9-dimethylperylene or 3-phenylperylene.

6. The composition of claim 5 wherein:
   the hexaarylbiimidazole is selected from 2,2'-bis(o-chlorophenyl) - 4,4',5,5' - tetraphenylbiimidazole or 2,2' - bis - (o - chlorophenyl) - 4,4',5,5' - (m-methoxyphenyl)biimidazole, and wherein
   the aromatic hydrocarbon is selected from perylene or 5,6,11,12-tetraphenylnaphthacene.

7. The composition of claim 2 containing, additionally,
   (C) a leuco dye that is oxidizable to dye by triarylimidazolyl radicals formed by photo-dissociation of the hexaarylbiimidazole.

8. The composition of claim 3 containing, additionally, (C) a leuco dye that is oxidizable to dye by triarylimidazolyl radicals which is selected from aminotriarylmethanes, aminoxanthanes, aminothioxanthenes, amino - 9,10 - dihydroacridines, aminophenoxazines, aminophenothiazines, aminodihydrophenazines, aminodiphenylmethanes, leuco indamines, aminohydrocinnamic acids, hydrozines, leuco indigoid dyes, amino - 2,3 - dihydroanthraquinones, tetrahalo - p,p' - biphenols, 2(p - hydroxyphenyl)-4,5-diphenylimidazoles, or phenethylanilines.

9. The composition of claim 4 containing, additionally, (C) a strong acid salt of an aminotriarylmethane leuco dye wherein at least two of the aryl groups are phenyl groups having (a) an $R_1R_2N$-substituent in the position para to the bond to the methane carbon wherein $R_1$ and $R_2$ are each selected from the class consisting of hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, C to $C_{10}$ arylsulfonamido, nitro or benzylthio.

10. The composition of claim 5 containing, additionally, (C) a strong acid salt of an aminotriarylmethane leuco dye having the structural formula

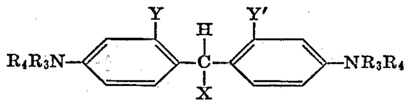

wherein $R_3$ and $R_4$ are each lower alkyl or benzyl, Y and Y' are lower alkyl and X is

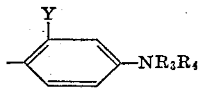

p-methoxyphenyl, 2-thienyl, phenyl, 1-naphthyl, 2,3-dimethoxyphenyl, 3,4 - methylenedioxyphenyl or benzylthiophenyl.

11. The composition of claim 6 which contains, additionally, a leuco dye selected from the p-toluenesulfonic acid salt of tris(p-N,N-diethylamino-o-tolyl)methane, or an equimolar mixture of the p-toluene sulfonic acid salts of bis(p - N,N - diethylamino - o - chlorophenyl)(p-chlorophenyl)methane and bis(p - N,N - diethylamino-o-tolyl)(p-isopropylthio-m-tolyl)methane.

12. The composition of claim 2 which contains, additionally, an addition-polymerizable, ethylenically unsaturated compound having at least one polymerizable ethylenic group, a photooxidizable amine and, optionally, a chain transfer agent.

13. The composition of claim 3 which contains, additionally, an addition-polymerizable, ethylenically unsaturated compound selected from terminally unsaturated carboxylic ester monomers, a photooxidizable amine, and optionally, a chain transfer agent selected from N-phenylglycine, 1,1-dimethyl-3,5-diketocyclohexane or an organic thiol.

14. The composition of claim 5 which contains additionally, an addition-polymerizable, ethylenically unsaturated compound selected from terminally unsaturated carboxylic ester monomers, a photooxidizable amine selected from a strong acid salt of an aminotriarylmethane leuco dye having the structural formula

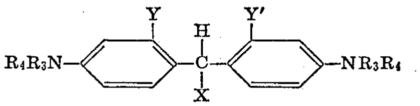

wherein $R_3$ and $R_4$ are each lower alkyl or benzyl, Y and Y' are lower alkyl and X is

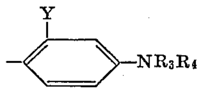

p-methoxyphenyl, 2-thienyl, phenyl, 1-naphthyl, 2,3-dimethoxyphenyl, 3,4 - methylenedioxyphenyl, or benzylthiophenyl, and optionally, a chain transfer agent selected from N-phenylglicine, 1,1-dimethyl-3,5-diketocyclohexane or an organic thiol.

15. The composition of claim 11 which contains additionally, pentaerythritol triacrylate.

16. Process of irradiating the composition of claim 2 with light having wavelengths within the range of the absorption bands of the aromatic hydrocarbon.

17. Process for imaging which comprises irradiating the composition of claim 7 with a color-forming dosage of light having wavelengths within the range of the absorption bands of the aromatic hydrocarbon.

18. Process for polymerization which comprises irradiating the composition of claim 12 with light having wavelengths within the range of the absorption bands of the aromatic hydrocarbon.

19. Process for imaging and polymerization which comprises irradiating the composition of claim 14 with light having a wavelength within the range of the absorption bands of the aromatic hydrocarbon, and an intensity sufficient to simultaneously produce a colored polymerized composition.

20. The composition of claim 1 coated on a plastic film.

21. The composition of claim 7 coated on a plastic film.

22. The composition of claim 9 coated on a plastic film.

23. The composition of claim 12 coated on a plastic film.

24. The composition of claim 14 coated on a plastic film.

25. The composition of claim 1 coated on paper.

26. The composition of claim 7 coated on paper.

27. The composition of claim 9 coated on paper.

28. The composition of claim 12 coated on paper.

29. The composition of claim 14 coated on paper.

30. A composition comprising the composition of claim 1 and an inert solvent.

31. A composition comprising the composition of claim 7 and an inert solvent.

32. A composition comprising the composition of claim 9 and an inert solvent.

33. A composition comprising the composition of claim 12 and an inert solvent.

34. A composition comprising the composition of claim 14 and an inert solvent.

References Cited

UNITED STATES PATENTS

| | | | |
|---|---|---|---|
| 3,390,994 | 7/1968 | Cescon | 96—48 |
| 3,390,996 | 7/1968 | MacLachlan | 96—48 |
| 3,390,997 | 7/1968 | Read | 96—48 |
| 3,479,185 | 11/1969 | Chambers | 96—115 |
| 3,527,639 | 9/1970 | Moraw | 96—90 |

FOREIGN PATENTS

| | | | |
|---|---|---|---|
| 997,396 | 7/1965 | Great Britain | 96—90 PC |

OTHER REFERENCES

Kosar, "Light Sensitive Systems," Aug. 27, 1965, pp. 142–143, John Wiley and Sons, New York.

NORMAN G. TORCHIN, Primary Examiner

R. FICHTER, Assistant Examiner

U.S. Cl. X.R.

96—48, 115 P